United States Patent [19]

Kashihara et al.

[11] Patent Number: 4,472,124
[45] Date of Patent: Sep. 18, 1984

[54] DEVICE FOR PRODUCING AN INFORMATION RECORDING DISK

[75] Inventors: Toshiaki Kashihara, Hirakata; Keisuke Ito, Kashihara; Yoshihiro Okino, Uji, all of Japan

[73] Assignee: Matsushita Electric Industrial Company, Limited, Osaka, Japan

[21] Appl. No.: 299,580

[22] Filed: Sep. 4, 1981

[30] Foreign Application Priority Data

| Sep. 5, 1980 [JP] | Japan | 55-123760 |
| Dec. 12, 1980 [JP] | Japan | 55-176078 |
| Dec. 16, 1980 [JP] | Japan | 55-178265 |

[51] Int. Cl.³ .......................................... B29D 17/00
[52] U.S. Cl. .................................... 425/3; 204/6; 264/107; 425/110; 425/174.4; 425/290; 425/810
[58] Field of Search ............... 425/3, 174.4, 110, 810, 425/411, 290; 204/6; 264/107

[56] References Cited

U.S. PATENT DOCUMENTS

| 2,465,276 | 3/1949 | Ryder | 425/3 |
| 3,023,458 | 3/1962 | Seymour | 425/566 X |
| 3,196,485 | 7/1965 | Bottenfeld | 425/810 X |
| 3,671,158 | 6/1972 | Rand et al. | 425/129 R |
| 3,749,828 | 7/1973 | Konthe et al. | 369/84 |
| 3,969,057 | 7/1976 | Pierre | 425/810 X |
| 4,301,099 | 11/1981 | Broeksema | 425/810 X |
| 4,306,852 | 12/1981 | Mateev | 425/566 X |
| 4,312,823 | 1/1982 | Kraakman | 425/810 X |
| 4,315,723 | 2/1982 | Antoine | 425/810 X |
| 4,340,353 | 7/1982 | Mayer | 425/810 X |

FOREIGN PATENT DOCUMENTS

| 2044583 | 3/1972 | Fed. Rep. of Germany | 425/566 |
| 2809161 | 7/1980 | Fed. Rep. of Germany | |
| 1316239 | 12/1963 | France | |
| 2039980 | 1/1971 | France | |
| 2278473 | 2/1976 | France | |
| 1301095 | 12/1972 | United Kingdom | |
| 1453276 | 10/1976 | United Kingdom | |
| 1581511 | 12/1980 | United Kingdom | |

OTHER PUBLICATIONS

Patents Abstracts of Japan, vol. 5, No. 25, Feb. 14, 1981, p. 697M55.

Primary Examiner—Jay H. Woo
Assistant Examiner—Tinker R. McBrayer
Attorney, Agent, or Firm—Lowe, King, Price & Becker

[57] ABSTRACT

A device for producing information recording disks comprises a stamper mount for placing a stamper thereon, a stamper-fixing shaft for fixing the stamper, and a pressing plate for pressing a backing plate toward the stamper after a liquid resin is injected in the space between the backing plate and the stamper. Injection is effected via a passage made at the center of the stamper mount, and the injected resin is stretched outwardly radially by pressing the backing plate. An ultraviolet ray is irradiated to the stretched resin through the backing plate to harden the resin. An injection valve movably received in the stamper-fixing shaft may be used so that uninjected resin is prevented from being hardened. The injection valve may have a center projection as well as a flange portion at its top so that machining for making a center hole of the disk is unnecessary. The periphery of the flange portion may be wetted by the resin before the backing plate is placed on the flange portion. The stretching speed of the resin is controlled so that air bubbles are prevented from being taken into the resin. The stamper may be attracted by magnetic forces to the stamper mount. A stamper having a fixing ring at its center may be used so that eccentricity is avoided.

16 Claims, 29 Drawing Figures

DEVICE FOR PRODUCING AN INFORMATION RECORDING DISK

BACKGROUND OF THE INVENTION

This invention relates generally to a device and a method for producing an information recording disk, such as a video disc, phonograph disc or the like, and more particularly, the present invention relates to a device and a method for producing information recording disks by stamping a synthetic resin by a disk stamper.

There are various methods for producing an information recording disk, and according to one conventional method, as is disclosed in Japanese Patent publication No. 53-33244, a flat layer of a liquid molding resin is provided on a stamper, on which undulations carrying information have been made, then a sheet or flat plate functioning as a backing plate is pressed to the flat layer of the resin so that the resin layer assumes a given thickness, and the resin is hardened by irradiating a suitable ray.

According to another known method, as is disclosed in Japanese Patent provisional publication No. 53-116105, a liquid molding resin is dropped onto a stamper in advance, and a backing plate, which has been convexly deformed, is pressed toward the resin so as to stretch the resin to be flat, or while the resin is held by the convexly deformed backing plate, the air between the stamper and the backing plate is sucked throughout the periphery of the stamper so as to stretch the resin. After the resin has been stretched on the stamper, a light ray is irradiated to harden the resin. Then the hardened resin is detached from the stamper. According to another method, the backing plate is pressed by a roller so as to uniformly form a resin layer on a stamper.

However, these conventional methods for producing an information recording disk have suffered from occurrence of air bubbles which are apt to be made in the finished products of the disks. It is easy for air bubbles to enter the liquid molding resin when the resin is placed on the stamper and when the resin is stretched by pressing the backing plate toward the stamper. Such air bubbles may result in dropout of information data in both stylus-contact and stylus-noncontact type information recording disks. Signal or data dropout in an information recording disk may result in deterioration of reproduced picture and/or sound quality. Especially in the case of a video disk, since the density of the data or signals is extremely high compared to ordinary phonograph disks, such air bubbles in the disk, which do not raise a serious problem in a phonograph disk, become a source of trouble. In the case of a video disk of the type arranged to be traced by a pickup stylus which is in contact with the surface of the disk, such air bubbles may damage the stylus. Namely, the presence of air bubbles mingled with the resin lowers the commercial value of an information recording disk.

SUMMARY OF THE INVENTION

The prsent invention has been developed in order to remove the above-mentioned disadvantage inherent to the conventional methods for producing an information recording disk.

It is, therefore, an object of the present invention to provide a device and a method for producing information recording disks, in which air bubbles are prevented from being mingled with the liquid molding resin when depositing and stretching it to form a disk, so that productivity can be improved while the quality of information recording disks can be elevated.

Another object of the present invention is to provide a device and a method for producing information recording disks, with which a produced disk can be readily detached from the stamper.

A further object of the present invention is to provide a device and a method for producing information recording disks, with which a liquid molding resin, which is not injected into the space between the backing plate and the stamper, is prevented from being hardened when the liquid molding resing already stretched receives an ultraviolet ray.

A still further object of the present invention is to provide a stamper assembly which can be readily centered with respect to the center of a stamper mount of a device for producing information recording disks.

A still further object of the present invention is to provide a stamper assembly with which a liquid molding resin injected into the space between the backing plate and the stamper is prevented from penetrating a gap or space between the stamper assembly and a stamping-fixing shaft engaged with a stamper mount.

A still further object of the present invention is to provide a device and a method for producing information recording disks, with which the stamper fixed to a stamper mount is prevented from being deformed when detaching a produced disk therefrom.

BRIEF DESCRIPTION OF THE DRAWINGS

The object and features of the present invention will become more readily apparent from the following detailed description of the preferred embodiments taken in conjunction with the accompanying drawings in which.

The same or corresponding element and parts are designated at like numerals throughout the drawings.

DETAILED DESCRIPTION OF THE INVENTION

Figure 1:
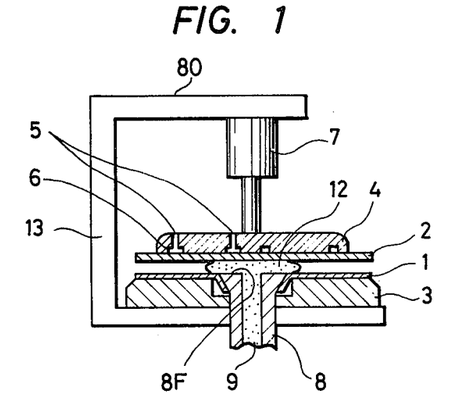
FIG. 1 is a schematic cross-sectional side view of an embodiment of the device according to the present invention.

Referring to FIG. 1, a schematic cross-sectional view of a device according to the present invention is shown. The device comprises a stamper mount 3 fixedly supported on a stand 13, a stamper-fixing shaft 8 movably received in a bore made in the center of the stamper mount 3, an air cylinder 7 attached to an arm 80 which is connected to the stand 13, and a pressing plate 4 attached to a movable shaft of the air cylinder 7. The pressing plate 4 is arranged such that the bottom surface thereof faces the upper surface of the stamper mount 3, while the bottom surface of the pressing plate 4 and the upper surface of the stamper mount 3 are parallel to each other. The pressing plate 4 has a plurality of through holes 5 through which air below the pressing plate 4 is sucked into a vacuum pump (not shown).

In use, a disk stamper 1 having an undulatory surface indicative of given information, such as audio and/or video signals, is placed on the stamper mount 3. In order to place the stamper 1 on the upper surface of the stamper mount 3, the stamper-fixing shaft 8 should be detached in advance. After placing the stamper 1 on the stamper mount 3, the stamper-fixing shaft 8 is engaged with the center bore of the stamper mount 3. The stamper-fixing shaft 8 has a flange portion 8F at its top end so that the stamper 1 having a center hole is securely held by the flange portion 8F of the stamper-fixing shaft 8 when the stamper-fixing shaft 8 is fully lowered. The stamper 1 has a downwardly bent wall portion around the center hole, and the flange portion 8F of the stamper-fixing shaft 8 is in contact with the wall portion when the stamper-fixing shaft 8 has been fully lowered as shown in FIG. 1. The position of the stamper-fixing shaft 8 is selected so that the end face of the flange portion 8F is flush with the upper surface of the stamper 1.

A backing plate 2, which will be a part of a disk to be produced, is held by the pressing plate 4 by attracting the same toward the lower surface of the pressing plate 4 by the suction force from the vacuum pump, and thus the backing plate 2 is parallel to the stamper 1. The vacuum suction force is led through passages 5 and grooves 6 both made in the pressing plate 4. The position of the backing plate 2 is adjusted by controlling the air cylinder so that the backing plate 2 is spaced from the upper surface of the stamper 1 by a given distance which is slightly larger than a desired thickness of a disk to be formed.

After the distance between the backing plate 2 and the stamper 1 has been set to the above-mentioned given value, a liquid molding resin 9 is injected or pressure fed via the stamper-fixing shaft 8 having a conduit therein into the space between the backing plate 2 and the stamper 1 in such a manner that the resin 9 is in contact with both the lower surface of the backing plate 2 and the upper surface of the stamper 1. After an adequate amount of the resin 9 for forming a single disk has been injected, or before the completion of resin injection, the air cylinder 7 is driven to lower the pressing plate 4. Thus, the pressing plate 4 presses the backing plate 2 downwarly so that the injected resin, which is indicated at the reference 12, is pressed between the backing plate 2 and the stamper 1. The air cylinder 7 is controlled so that the distance between the lower surface of the backing plate 2 and the upper surface of the stamper 1 becomes a predetermined value corresponding to the thickness of a disk to be formed. A pressing force of 0.1 to 0.2 Kg/cm$^2$ is applied for several seconds to several tens of seconds.

After the thickness of the resin 12 has been set to the given value, the air cylinder 7 is controlled to raise the pressing plate 4 so that the pressing plate 4 is apart from the backing plate 2. At this time the resin 12 is liquid, and therefore, it is necessary to harden the same.

The synthetic resin 9 used as the material of information recording disks may be an epoxy acrylate resin, a polyester acrylate resin, a urethane acrylate resin or the like, and a suitable additive including a hardener is added to the resin 9 in advance.

Figure 2:
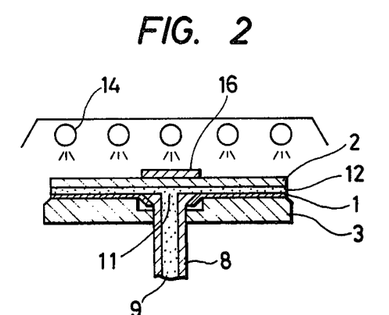
FIG. 2 is a view showing a hardening process.

FIG. 2 illustrates a method of hardening the liquid resin 12 interposed between the backing plate 2 and the stamper 1. A suitable light source 14 is positioned above the backing plate 2 to irradiate the stretched layer of the resin 12 by a light ray. As the light source, a mercury-arc lamp, a fluorescent lamp used for photo polymerization or the like is suitable because the resin 12 satisfactorily hardens by an ultraviolet light, especially having wavelength of 365 nm and 366 nm. By this hardening operation, if the resin 9 around the end opening 11 of the counduit of the stamper-fixing shaft 8 were hardened, successive production of a plurality of disks would be impossible. Therefore, in order to prevent the resin 9 around the opening 11 from hardening, a shielding plate 16 having a diameter of 20 millimeters or so is placed on the backing plate 2. Thus, the ultraviolet ray from the light source 14 is partially blocked by the shielding plate 16. Irradiation of the ultraviolet ray is performed for several seconds to several minutes, and then a molded resin layer, which has been hardened in contact with the backing plate 2, is detached from the stamper 1. At this time, although the resin below the shielding plate 16 has not been hardened enough, the resin of this portion may be suitably processed after detaching the molded resin layer since this portion corresponds to a non-recorded portion. For instance, the resin of this portion, which is the center of the molded resin layer, may be hardened by irradiating an ultraviolet ray after the molded resin layer has been detached from the stamper 1. As an alternative method, this portion may be removed by making a center hole, which will be used for centering, with this portion left unhardened. Namely, when a replica disk is produced by the pressing or stamping device of FIG. 1, it is necessary to process or machine the center portion of the disk. This necessity can be removed by the following embodiments.

Figure 3:
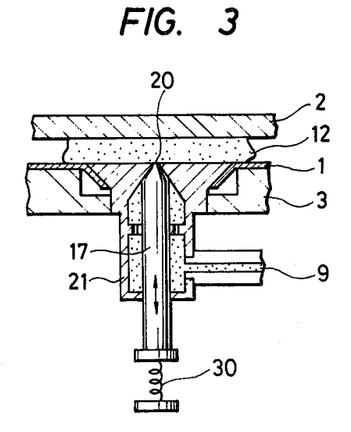
FIGS. 3 to 7 are partial cross-sectional views of other embodiments of the device according to the present invention.

Hence, reference is now made to FIG. 3 which shows an enlarged view of a second embodiment device. The device of FIG. 3 differs from that of FIG. 1 in that the stamper-fixing shaft 21 for feeding the liquid molding resin 9 has a tapered outlet or opening 20, and is equipped with a movable pin 17 whose tip is engagable with the inner surface of the tapered outlet 20. Thus, the pin 17 closes the outlet 20 when it is moved upwardly, and opens the same when moved downwardly. The pin 17 is biased by a force of a coil spring 30 attached to the bottom end of the pin 17. When it is intended to inject the liquid molding resin into the space between the backing plate 2 and the stamper 1, the pin 17 is lowered so that the outlet 20 opens. After injection, the pin 17 is moved upwardly by the force of the coil spring 30 to close the outlet. Since the outlet 20 is hermetically closed by the pin 17, the ultraviolet ray from the light source 14 of FIG. 1 is not transmitted to the resin 9 in the bore or conduit of the stamper-fixing shaft 21. Accordingly, the shielding plate 16 of FIG. 2 is not needed in the embodiment of FIG. 3.

Figure 4:
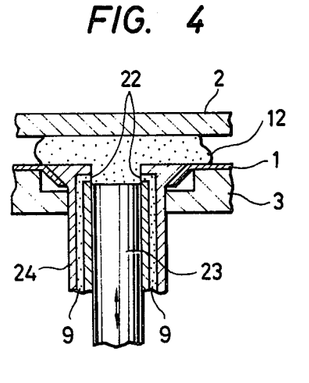

FIG. 4 shows another embodiment which is a modification of FIG. 3. In this embodiment, the outlet of the stamper-fixing shaft 24 for injecting the resin 9 is not tapered, while the stamper-fixing shaft 24 has a cylindrical bore for receiving a movable pin 23, and passages for feeding the resin 9. The passages are provided outside the bore and communicate with the bore at their outlets 22 in the vicinity of the top end of the stamper-fixing shaft 24. The movable pin 23 is arranged to move downwardly to open outlets of the passages so that the resin 9 can be injected through the bore into the space between the backing plate 2 and the stamper 1. On the other hand, after a given amount of the resin 9 has been injected, the movable pin 23 is raised so that the top end surface of the movable pin 23 is flush with the end surface of the flange portion of the stamper-fixing shaft 24. Therefore, the outlets 22 of the passages are closed to prevent the liquid resin 9 in the passages from hardening.

According to the above-described embodiments, the replica disk produced in the above-mentioned manner does not have a center hole, and therefore, it is necessary to machine the disk after the hardened resin layer of the disk has been detached from the stamper 1. The present inventors have devised another method with which a center hole can be automatically made in the center of the disk during pressing operation.

Figure 5:
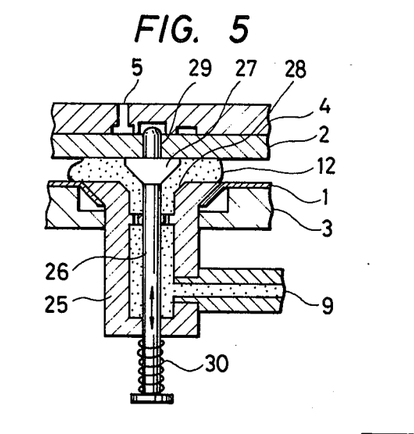
Figure 6:
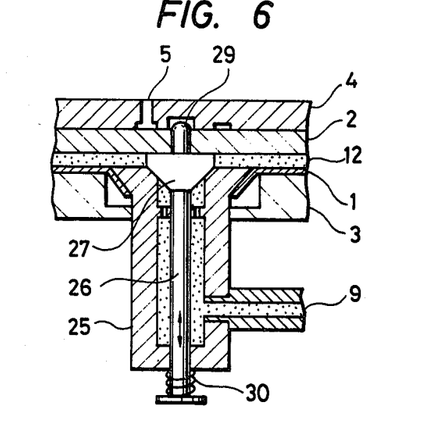

Hence, reference is now made to FIG. 5 which shows an enlarged view of a device for carrying out the above method. The embodiment of FIG. 5 comprises a movable pin 26 having a tapered flange portion 27. The movable pin 26 is movably received in the stamper-fixing shaft 25 having a tapered outlet 28. The movable pin 26 has a center projection 29 at its top end, namely at the center of the upper surface of the flange portion 27. The backing plate 2 has a center hole so that the center projection 29 of the movable pin 26 penetrates therethrough. The pressing plate 4 has a recess at its center for receiving the top end of the center projection 29. The tapered portion of the flange portion 27 of the movable pin 26 functions as an injection valve with respect to the tapered outlet 28 of the stamper-fixing shaft 25. Therefore, the movable pin 26 is referred to as an injection valve hereafter. The injection valve 26 is biased upwardly by the force of a coil spring 30 so that the flange portion 27 is located above the outlet 28 of the stamper-fixing shaft when no external force is applied to the injection valve 26 as shown in FIG. 5. As a result, there is a space between the tapered flange 27 of the injection valve 26 and the tapered outlet 28 of the stamper-fixing shaft 25 so that the liquid molding resin 9 can be injected via this space into the space between the backing plate 2 and the stamper 1. After the injection, the air cylinder 7 (see FIG. 1) is driven to lower the pressing plate 4. The backing plate 2 as well as the injection valve 26 lowers to cause the tapered portion of the tapered flange 27 to come in contact with the tapered outlet 28. Thus, the outlet 28 is closed as shown in FIG. 6. At this time, the liquid resin 12 has been stretched over the entire stamper 1, while the space between the backing plate 2 and the stamper 1 has been set to a predetermined value corresponding to a desired thickness of a disk to be produced. Then the pressing plate 4 is raised to be disengaged from the backing plate, and irradiation by an ultraviolet ray is effected to harden the liquid molding resin 12. Since the ultraviolet ray is blocked by the tapered flange 27 of the injection valve 26, the ray is not applied to the liquid resin 9 in the bore of the stamper-fixing shaft 25. Although it has been described that the pressing plate 4 was disengaged from the backing plate 2 prior to the application of the ultraviolet ray, if the pressing plate 4 is made of a material through which the ultraviolet ray is transmitted, the ultraviolet ray may be applied with the pressing plate 4 engaged with the backing plate 2.

In order that the ultraviolet ray propaget through the backing plate 2, the backing plate should be made of a transparent material, such as polyvinyl chloride, polymethyl methacrylate or the like.

The tapered flange 27 has a nontapered portion at its top end. The nontapered portion has a columnar shape, and the diameter thereof is greater than the diameter of the center projection 29, where the latter diameter corresponds to the diameter of a center hole of the backing plate 2. Therefore, centering of the replica disk can be automatically effected to provide a replica disk having a center hole when the liquid resin 12 is hardened and is fixedly attached to the backing plate 2.

Figure 7:
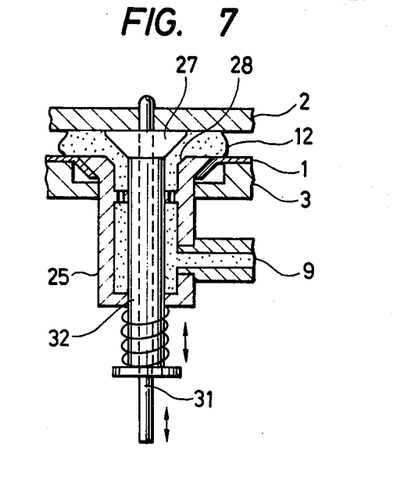

FIG. 7 illustrates a modification of the embodiment of FIG. 6. The embodiment of FIG. 7 differs from that of FIG. 6 in that the injection valve 32, i.e. the movable pin, has a center bore for receiving a movable shaft 31. The movable shaft 31 has a top end which functions as the center projection 29 of FIGS. 5 and 6. Namely, the movable shaft 31 is positioned so that the top end thereof projects from the end surface of the tapered flange 27 of the injection valve 32 until the liquid resin 12 is hardened in the same manner as described in the above. After the resin 12 has been hardened, the movable shaft 31 is lowered so that the top end thereof is flush with the end surface of the tapered flange 27. Thus, the hardened resin layer of the disk can be readily detached from the stamper 1 because nothing projects beyond the end surface of the flange portion 27 of the injection valve 32.

From the above, it will be understood that there is no need to machine the replica disks produced in the above-described manner of FIGS. 5, 6 and 7, improving the the efficiency in production. Since no machining process is required after the disk is removed from the stamper 1, the signal surfaces of replica disks produced in this manner can be prevented from becoming dirty. Furthermore, since the center hole is automatically made during pressing operation, it is possible to provide information recording disks having less eccentricity, resulting in high productivity.

The following embodiments are improvements of the embodiments of FIGS. 5 to 7, and the produced disk can be smoothly detached from the stamper 1 without being hooked by the upper portion of the injection valve.

Figure 8:
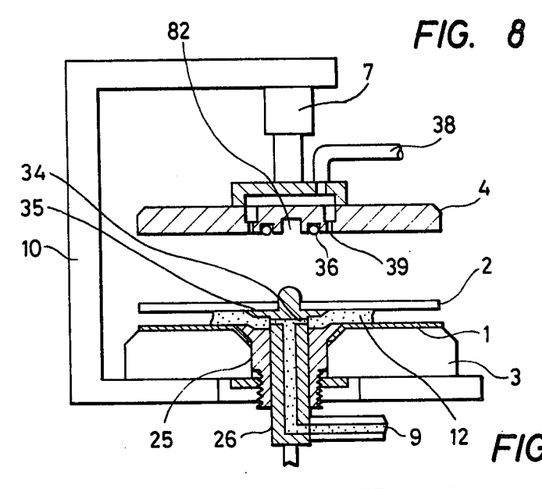
FIG. 8 is a schematic cross-sectional view of another embodiment of the device according to the present invention.

Hence, reference is now made to FIG. 8 which shows another embodiment of the present invention. The embodiment of FIG. 8 comprises an injection valve 26 having a passage therein. The injection valve 26 is movably received in a stamper-fixing shaft 25 which is screwed in a screw hole made in the stand 10. A plurality of outlets 34 are made in the injection valve 26, where these outlets 34 communicate with the passage made in the center of the injection valve 26. The injection valve 26 comprises a flange portion 35 above the outlets 34, and a center projection integrally formed with the flange portion 35. The pressing plate 4 has a recess 82 at the center thereof in the same manner as in the embodiments of FIGS. 5 to 7, while the backing plate 2 also has a through hole. The pressing plate 4 has a plurality of air-supply outlets 39 which communicate with a passage 38 connected to a pressured gas source (not shown). An annular recess is made around the center recess 82 for receiving an O-ring 36 made of an elastic material such as rubber. The pressing plate 4 is connected to a movable shaft of the air cylinder 7 in the same manner as in the previous embodiments. However, the embodiment of FIG. 8 differs from these previous embodiments in that pressurized gas, such as dried air or nitrogen, is arranged to be blown off from the air outlets 39. The diameter of each of the air outlets 39 is narrowed so that the speed of the gas is as high as the velocity of sound.

The stamper-fixing shaft 25 has, at its top end, a circular recess in which the flange portion 34 of the injection valve 25 can be partially fitted in.

The device of FIG. 8 operates as follows. First, the stamper 1 is placed on the stamper mount 3 and is fixed by engaging the stamper-fixing shaft 25 with the stand 10. After the stamper 1 has been set, the injection valve 26 is moved upwardly as shown in FIG. 8 and the backing plate 2 is placed on the upper surface of the flange portion 34 of the injection valve 26 with the pressing plate 4 lifted up. The liquid molding resin 9 is injected through the passage of the injection valve 26 into the space between the backing plate 2 and the stamper 1 by pressure feeding the same. During injection or after injection, the pressing plate 4 is lowered by driving the air cylinder 7. Since the O-ring 36 is attached to the pressing plate 4 in such a manner that a portion of the O-ring projects beyond the lower surface of the pressing plate 4, the O-ring 36 comes into contact with the upper surface of the backing plate 2. The pressing plate 4 is further lowered so that the O-ring 36 is deformed. At this time, the above-mentioned gas is blown off from the air outlets 39 toward the upper surface of the backing plate 2. Thus, pressure is applied by the gas to the backing plate 4, where the pressure is maximum right below the air outlets 39 which are coaxially arranged with respect to the center of the pressing plate 4. The gas pressure applied to the backing plate 2 lowers along the outward radial directions, and pressure at the periphery of the backing plate 2 equals the pressure of atmosphere. With this pressure gradient, the backing plate 2 is deformed in such a manner that the distance between the lower surface of the backing plate 2 and the upper surface of the stamper 1 at the periphery of the backing plate 2 is greater than the space between the same at portions closed to the center of the backing plate 2. By the application of the pressure to the backing plate 2 and by the above-mentioned deformation of the same, the liquid molding resin 12 around the outlets 34 is pressed to be stretched outwardly radially.

Figure 9:
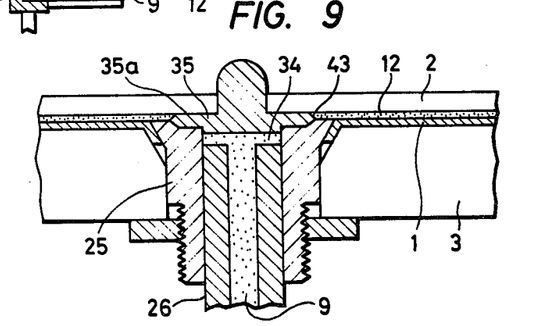
FIG. 9 is a schematic partial cross-sectional view of another embodiment corresponding to a modification of the embodiment of FIG. 8.

FIG. 9 illustrates a condition that the resin 12 has been stretched by the above-described process. At this time the lower surface of the flange portion 35 of the injection valve 26 is received in the recess made at the top of the stamper-fixing shaft 25. An ultraviolet ray is applied through the backing plate 2 to the resin 12 so that the resin 12 is hardened. The hardened resin layer is detached together with the backing plate 2 from the stamper 1 to provide a finished product of an information recorded replica disk. In FIG. 8, the flange portion 35 of the injection valve 26 is illustrated such that the peripheral wall thereof is tapered so that the diameter of the upper surface of the flange portion 35 is greater than that of the lower surface thereof. Therefore, when detaching the disk from the stamper 1, the disk is apt to be hooked by the edge portion between the upper surface and the peripheral wall of the flange portion 35, and therefore, it may be difficult to smoothly detach the disk. Because of this problem, the disk may be partly damaged around its center hole. In order to remove this problem, it is preferable that the upper edge of the flange portion 35 is beveled so that the edge takes an obtuse angle in its cross section as shown in FIG. 9. In FIG. 9 a beveled edge is indicated at a reference 43.

Figure 10:
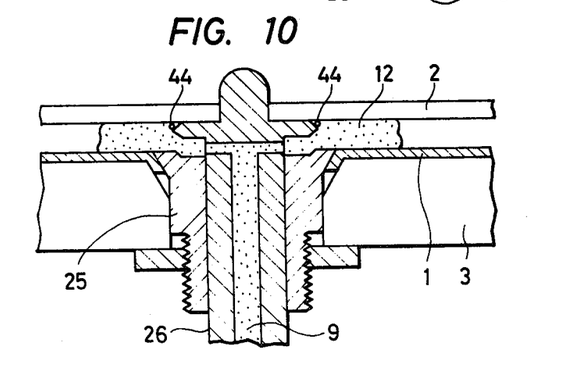
FIG. 10 is an explanatory view showing a state that air bubbles have been taken into the liquid molding resin around the injection valve of the device of FIG. 9.

With the provision of such a beveled edge 43, although the disk can be satisfactorily detached from the stamper without being damaged, such a beveled edge 43 of the flange portion 35 may result in occurrence of air bubbles 44 as shown in FIG. 10. Namely, since the liquid resin 9 is injected from the outlet of the injection valve 26, air between the beveled edge 43 and the lower surface of the backing plate 2 is apt to be covered by the injected resin 12, to cause occurrence of air bubbles 44 whose diameter is 50 to 500 micrometers or so. The air bubbles 44 remained at the upper inner corner of the resin 12 leave the corner in the middle of the above-mentioned pressing process, and move outwardly as the liquid molding resin 12 is stretched. If the air bubbles 44 are moved to the outmost portion corresponding to the periphery of the backing plate 2 so that the air bubbles 44 are off the signal recorded portion, there would be no problem. Actually, however, there is only a small possibility that the air bubbles 44 move to the outmost portion of the stretched resin 12. Namely, the pressing process is terminated when air bubbles 44 are in the signal recorded portion which is the most important portion of the disk. Although several air bubbles remain in the disk, the presence of such air bubbles will be a defect of an information recording disk, especially in the case of a video disk whose signal density is extremely high. Presence of such air bubbles 44 raises various problems as set forth in the beginning of this specification.

Figure 11:
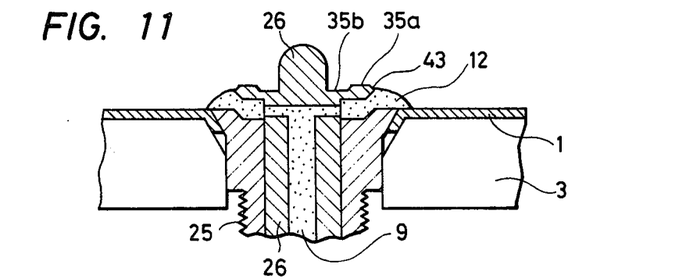
FIGS. 11 to 16 are explanatory views showing the method according to the present invention.
Figure 12:
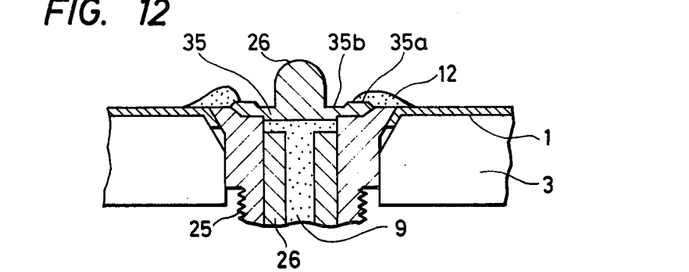
Figure 13:
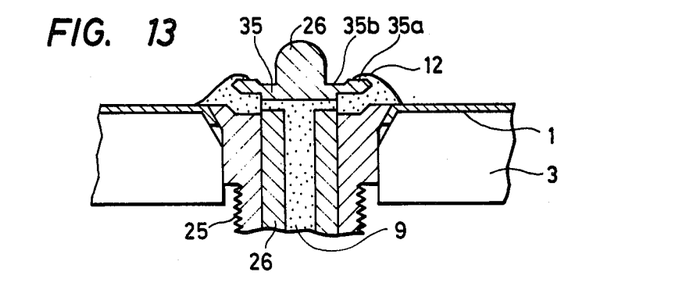
Figure 14:
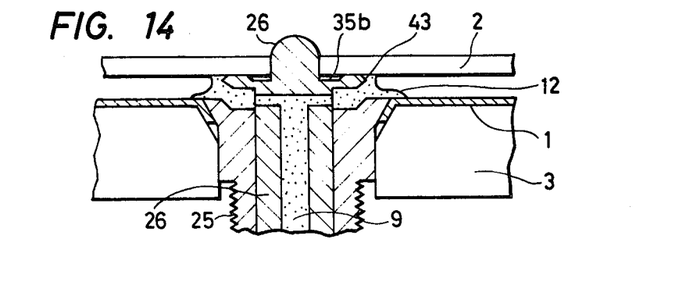

The inventors of the present invention have devised a method for removing the above problem caused by the flange portion 35 having the beveled edge 43. This method will be described with reference to FIGS. 11 to 16. Prior to placing the backing plate 2 on the upper surface of the flange portion 35 of the injection valve 26, a small amount of the liquid molding resin 9 is injected from the outlet of the injection valve as shown in FIG. 11. Then the injection valve 26 is lowered, as shown in FIG. 12, so that the beveled edge 43 and the upper surface of the flange portion 35 are covered and wetted by the injected resin 12. Nextly, the injection valve 26 is raised as shown in FIG. 13, opening the outlet of the injection valve 26. The backing plate 2 is then placed on the upper surface of the flange portion 35 as shown in FIG. 14. The resin 12 on the upper surface of the flange portion 35 is pressed by the backing plate 2 so that a portion of the resin 12 is moved outwardly while remaining resin 12 is moved inwardly. The resin 12 moved inwardly from the upper surface of the flange portion 35 will be received in an annular recess 35b made at the upper surface of the flange portion 35. Therefore, the resin 12 is prevented from entering into the space between the center hole of the backing plate 2 and the center projection 29, so that the disk will be readily detached from the stamper after being hardened. Under the condition of FIG. 14, a given amount of resin 12 required for forming a single disk is injected in the same manner as described in connection with the previous embodiments. According to this method, since the corner portion defined between the beveled edge 43 and the lower surface of the backing plate 2 is filled with the resin 12, the problem due to air bubbles does not occur.

In order to carry out the above method, the up/down movement of the injection valve 26 may be automatically controlled by a suitable driving circuit (not shown). Although the position of the injection valve 26 is controlled in the above-described method so that the beveled edge 43 of the flange portion 35 is made wet prior to placing the backing plate 2, the beveled edge 43 may be made wet by the resin 12 manually. Namely, a given amount of the resin 12 may be painted manually around the beveled edge 12 before the backing plate 2 is placed on the upper surface of the flange portion 35.

Figure 15:
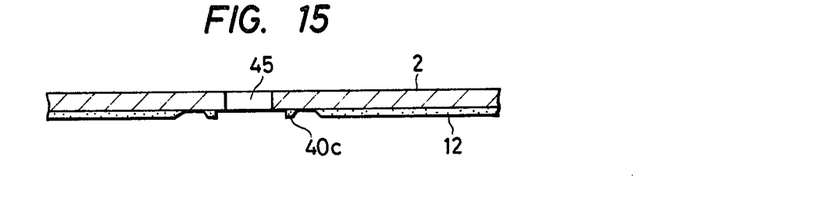
Figure 16:
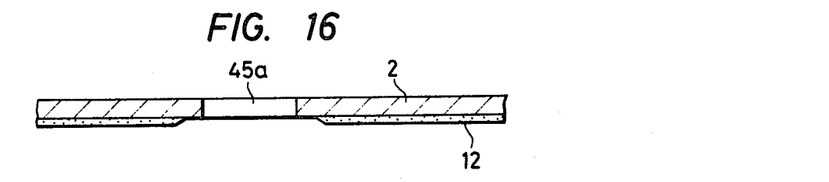

The stretched resin 12 is then hardened in the same manner as described in the above, and the hardened resin layer fixedly attached to the backing plate 2 is detached from the stamper 1. The detached resin layer has a structure as shown in FIG. 15. Namely, an annular projection 40c is made around the center hole of the backing plate 2 because of the annular recess 35b of the upper surface of the flange portion 35. The annular projection 40c is unnecessary, and therefore, it may be removed by widening the center hole 45 of the backing plate 2 from the state of FIG. 15 to another state of FIG. 16 where a widened center hole is indicated at a reference 45a. In this case, the diameter of center hole 45 of FIG. 15 should be smaller than the given diameter of the center hole 45a which is obtained after widening. In the case that the diameter of the center hole 45 cannot be widened because the diameter already corresponds to the given value, the annular projection 40c may be left as it stands.

In the previous embodiments, it has been described that the backing plate 2 is pressed by the pressing plate 4 or by the pressured gas from the pressing plate 4 so that the liquid molding resin between the backing plate 2 and the stamper 1 is stretched radially outwardly. The stretching velocity of the liquid molding resin 12 has a relationship with respect to the degree of the occurrence of air bubbles, and this relationship will be described.

It has been recognized by the inventors that small air bubbles (most of which have a diameter which is less than 100 micrometers) are greately introduced in the liquid molding resin 12 when the stretching speed of the resin 12 exceeds a predetermined value.

Figure 17:
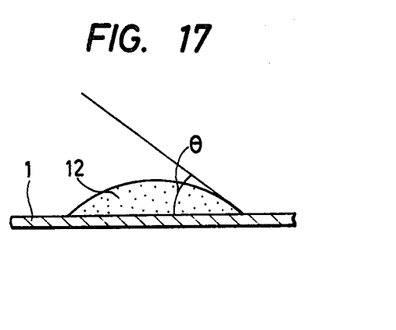
FIGS. 17 to 19 are explanatory diagrams showing the contact angle of the liquid molding resin with respect to the stamper.

A contact angle of a liquid with respect to a solid has significance in the degree of wetting therebetween. FIG. 17 shows a contact angle $\theta$ of the liquid molding resin 12 in the case that the resin 12 is dropped on the stamper 1 positioned horizontally. In the case that the stamper 1 is made of Ni, if the surface thereof is clean, the contact angle $\theta$ will be approximately 15 degrees. When the stamper 1 is coated with nonelectrolytic Ni or plated by a different type of Ni plating bath, the value of the above-mentioned $\theta$ does not change very much. This contact angle $\theta$ is affected by a condition of being left in atmosphere or by a condition of storage. Furthermore, changes in the constituents of the resin and the viscosity do not cause a large change in the contact angle $\theta$, because viscosity is an internal matter of the resin, while the contact angle $\theta$ is determined by the mutual action between the surface of the resin and exterior. Accordingly, the liquid molding resin 12 of the type arraned to be hardened by an ultraviolet ray can be said to have a characteristic of wetting the stamper 1 very well. On the other hand, the contact angle of the resin 12 with respect to the backing plate 2 made of polymethyl methacrylate or polyvinyl chloride is between 16 and 23 degrees.

Figure 18:
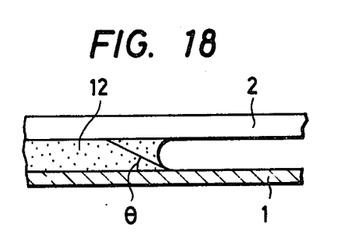
Figure 19:
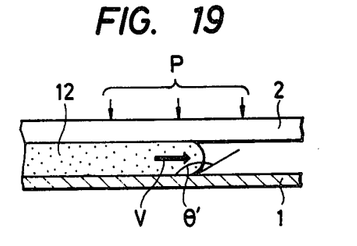

FIG. 18 shows a condition that the liquid molding resin 12 has been injected into the space between the backing plate 2 and the stamper 1. When no external force is applied to the resin 12, the contact angle of the resin 12 with respect to the stamper 1 equals the contact angle of FIG. 17. FIG. 19 shows a condition that the resin 12 is stretching outwardly radially as the backing plate 2 receives a downward pressure P. At this time, the resin 12 is stretching at a speed V, and therefore, its contact angle $\theta'$ is considerably larger than the cotact angle $\theta$ of FIGS. 17 and 18. From the above analysis, it will be understood that the wetting condition or degree in the case of a travelling resin cannot be discussed on the basis of the wetting condition in the case of a stationary resin.

Namely, in order that the surfaces of the stamper 1 and the backing plate are wetted well by the moving or stretching resin 12, the contact angle $\theta'$ has to be considered in a dynamic condition. According to experiments it has been recognized that when the stretching speed V of the liquid molding resin 12 was held less than 5 cm/sec to 10 cm/sec, fine air bubbles were not taken in the resin 12. In order to suppress the stretching speed of the resin 12 below 10 cm/sec, the lowering speed of the pressing plate 4 is controlled. Namely, when pressing and thus stretching the injected liquid molding resin 12 from the state of FIG. 10 to the state of FIG. 9, the lowering speed of the pressing plate 4 is made small. This point will be described with a graphical representation of the vertical position of the pressing plate 4 with respect to time.

Figure 20:
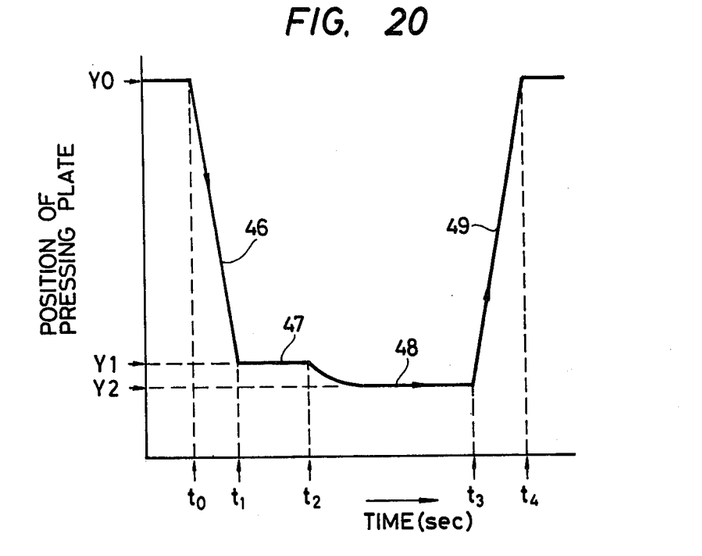
FIG. 20 is graphical representation showing the vertical position of the pressing plate of the device according to the present invention with respect to time.

In FIG. 20, the reference Y0 indicates the most raised position of the pressing plate 4; Y1, is the position of the same where the O-ring 36 (see FIG. 8) of the pressing plate 4 is in contact with the backing plate 2, and the lowering movement of the pressing plate 4 is stopped to inject the liquid molding resin 9; Y2, is the lowest position of the pressing plate 4 where the injected resin 12 has been completely stretched after further lowering the pressing plate 4 so that the resin 12 assumes a given thickness. Namely, the pressing plate 4 is lowered from time t0 till t1 at a relatively high speed (see curve 46). At time t1, the O-ring 36 abuts against the upper surface of the backing plate 2 so that the resin 9 is injected in the interval between t1 and t2 (see curve 47). The following interval between t2 and t3 (see curve 48) is for pressing the backing plate 2 to stretch the resin 12, and the interval between t3 and t4 (see curve 49) is for raising the pressing plate 4 at a relatively high speed. It will be understood from the different slopes of these curves that the lowering speed of the pressing plate 4 between t2 and t3 (curve 48) is considerably smaller than that in the interval between t0 and t1 (curve 46). The slow speed in the interval between t2 and t3 is set to a value so that the stretching speed V of the liquid molding resin 12 does not exceed 10 cm/sec.

Although the contact angle does not change with the viscosity of the resin very much, the stretching speed V of the resin varies in accordance with the viscosity thereof. Namely, the lower the viscosity, the faster the stretching speed. Consequently, in the case of a low viscosity resin, it is necessary to further reduce the lowrering speed of the pressing plate 4 so that the stretching speed of the resin 12 is maintained below 10 cm/sec. The upper limit of the viscosity of resins which can be used as the material of information recoding disks, is approximately 5000 to 10000 centipoise. In order to suppress the stretching speed below 10 cm/sec even in the case of a resin having low viscosity, it is necessary to suppress the lowering speed of the pressing plate 4 below several millimeters per second during the period between t2 and t3 (curve 48) of FIG. 20. The lowering speed of the curve 46 as well as the raising speed 49 of the curve 49 may be set much greater than the speed of the curve 48.

At the beginning of the curve 48 of FIG. 20 the lowering slope becomes gentler because the resin 12 is in a state that it is readily stretched immediately after the injection of the same while the space between the backing plate 2 and the stamper 1 is relatively great, and because the lowering speed lowers as the thickness becomes smaller and smaller to aproach a given value. The resin 12 will be hardened by an ultraviolet ray as described in the above after the inteval of the curve 48. According to this embodiment since the lowering speed of the pressing plate 4 has been made small only in connection with the stretching operation of the resin 12 as indicated by the curve 48 so that the stretching speed of the resin is set to 10 cm/sec, time required for completing one cycle of the movement of the pressing plate 4 can be maintained short.

In the previous embodiments, it has been described that the stamper 1 is fixed to the stamper mount 3 as shown in FIG. 1. The stamper 1 should be securely fixed to the mount 3 so that no liquid resin penetrates the space between these two members. If the resin 12 were hardened with a portion thereof penetrated the space between the stamper 1 and the stamper mount 3, it would be difficult to detach the produced replica disk, while the quality of the disk would be deteriorated because of occurrence of undulations around the center thereof. The present inventors have invented a new struture of a stamper which can be securely fixed to the stamper mount 3 as will be described later. Prior to describing the new structue of the stamper, a coventional method of fixing a conventional stamper to a stamper mount will be described for a better understanding of the feature of the new stamper.

Figure 21:
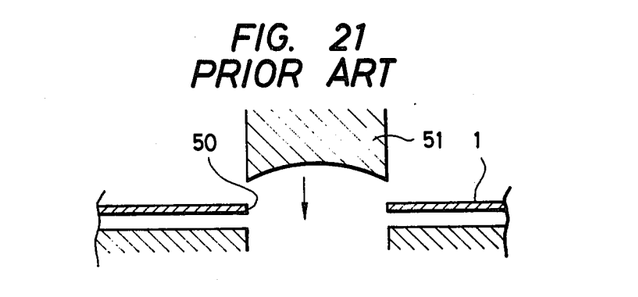
FIGS. 21 and 22 show a conventional method for making a center hole in a stamper and for shaping the center hole to be readily supported by a stamper-fixing shaft.
Figure 22:
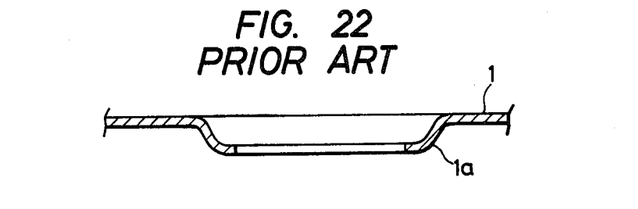
Figure 23:
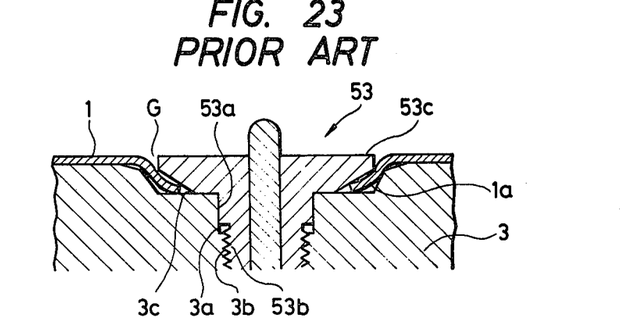
FIG. 23 is an explanatory view showing a conventional way of supporting the stamper of FIG. 22.

FIGS. 21 to 23 show the conventional method of fixing a conventional disk stamper 1 to a stamper mount 3. In the conventional method, machining of center hole has been essential. Namely, as shown in FIG. 21, a disk-like stamper 1, which has been formed by plating by an electroforming technique, is machined by means of a punch 51 and a die 52 to make a center hole 50 so that the center hole 50 and the information recorded circular grooves (not shown) are coaxial with each other. Then the center hole 50 is shaped by a press and a forming die (neither of which shown) so that the center hole 50 is concave as shown in FIG. 22. The reference 1a indicates a concave center portion. The stamper 1 formed in this way is put on the stamper mount 3, and is fixed, at its periphery, to the stamper mount 3 by means of fixing members (not shown), while the center portion of the stamper 1 is also fixed to the stamper mount 3 by means of a fixing member 53 as shown in FIG. 23. The fixing member 53 is arranged to be screwed in a screw hole made in the center of the stamper mount 3. In detail, the fixing member 53 has a telescopically engaging portion 53a which is arranged to be received in an inner wall 3a placed above the screw hole 53b so that the fixing member 53 is positioned at the center of the stamper mount 3. The reference 53b is a threaded portion of the fixing member 53. The fixing member 53 has a flange portin 53a extending radially, and this flange portion 53c is arranged to be received in a circular recess 3c which is coaxial with the above-mentioned inner wall 3a portion and the srew hole 53b. The stamper 1 is fixed by holding the concave center portion 1a between the flange portin 53 of the fixing member 53 and the circular recess 3c of the mount 3.

However, it is to be noted that an annular gap G is made between the periphery of the flange portion 53 and the upper surface of the concave center portion 1a of the stamper 1. Because of the presence of the annular gap G when injecting and pressing the resin 12, the liquid resin is apt to enter this gap G. If the resin which penetrated the gap G were hardened, it would be difficult to detach the formed disk from the stamper 1. Therefore, the disk is apt to be damaged or deformed at the center thereof when detaching from the stamper 1. In addition to such a disadvantage caused by the presence of the annular gap G, the centering accuracy of the center hole of the disk with respect to the information grooves, which is achieved by the flange portion 53c of the fixing memeber 53 is not high enough. Especially, in the case of producing a video disk in which information is recorded at a high density, centering accuracy has to be very high.

Figure 24:
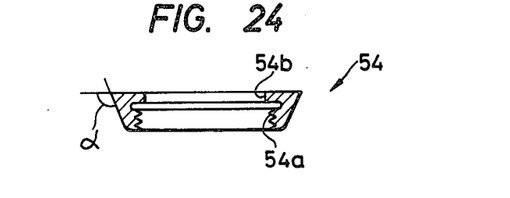
FIG. 24 is a schematic cross-sectional view of a fixing ring which is a part of a stamper assembly according to the present invention.
Figure 25:
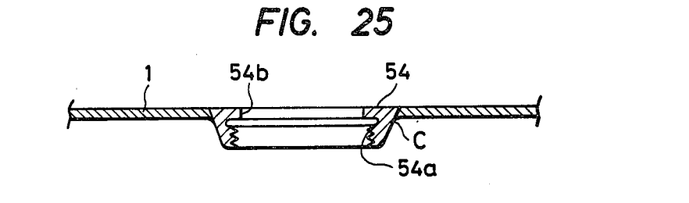
FIG. 25 is a schematic cross-sectional view of the stamper assembly according to the present invention.
Figure 26:
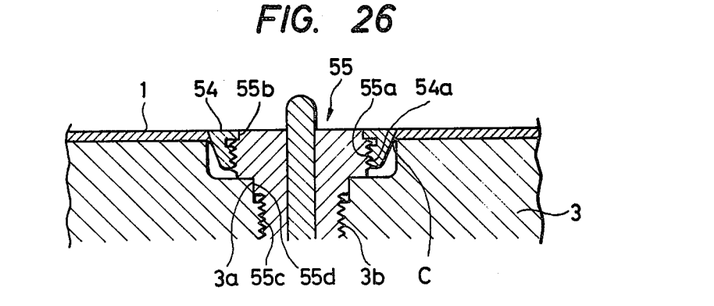
FIG. 26 is an explanatory view showing the state that the stamper assembly of FIG. 25 has been fixed by means of a stamper-fixing shaft to a stamper mount of the device according to the present invention.

Hence, reference is now made to FIGS. 24 to 26 which show the new structure of the stamper 1 according to the present invention. FIG. 24 is a schematic cross-sectional view of a fixing ring 54 which will be used to fix the disk stamper 1 to the stamper mount 3. The fixing ring 54 is made of a conductive material, and a threaded portion 54 is formed at the inner wall close to one side. At the other side of the inner wall is made an enagaging portion 54b which will be engaged with the top of a flange portion of a fixing member as will be described later. The fixing ring 54 is attached to a mother record (not shown), from which a plurality of stampers will be formed, in such a manner that the fixing ring 54 is coaxial with the information grooves of the mother record. Then the mother record is plated by electroforming together with the fixing ring 54. As a result of electroforming, a disk-like stamper 1 is formed, to which the fixing ring 54 has been secured by the electroforming plating. The completed stamper 1 having the fixing ring 54 at its center may be referred to as a stamper assembly, and this assembly is detached from the mother record. The detached stamper assembly is shown in a cross-sectional view in FIG. 25. In order to provide an adequate thickness of the plating around the corner portion C between the lower surface of the mother disk and the outer wall of the fixing ring 54, the outer wall of the fixing ring 54 is inclined or tapered so that the diameter at the upper side of the fixing ring 54 is greater than that at the lower side thereof. Namely, the angle α defined between the upper surface and the outer wall of the fixing ring 54 is made obtuse as shown in FIG. 24. Thus, adequate contacting force between the stamper 1 and the fixing ring 54 is ensured.

Since the stamper assembly 1 according to the present invention has the above-described structure, the information recorded grooves of the stamper 1 are coaxial with the engaging portion 54 of the fixing ring 54 with high accuracy.

The stamper assembly 1 produced in this way may be attached to the stamper mount 3 of the disk producing device as shown in FIG. 26. Namely, the stamper mount 3 is equipped with a stamper-fixing shaft 25 which corresponds to those of previous embodiments, where the stamper-fixing shaft 25 has a threaded portion 55c arranged to be engaged with a screw hole 3b made in the center of the stamper mount 3. The stamper-fixing shaft 55 has another threaded portion 55a arranged to be engaged with the threaded portion 54a of the fixing ring 54, and an engaging portion 55b at its top to be engaged with the engaging portion 54b of the fixing ring 54. The fixing ring 55 has a circular outer wall portion 55d arranged to be telescopically received in a circular bore 3a coaxially arranged with the screw hole 3b of the stamper mount 3. Although a center shaft is shown to be engaged with a center bore of the stamper-fixing shaft 55 in FIG. 26, the center shaft may be replaced with the injection valve 26 of previous embodiments.

As described in the above, the stamper assembly 1 can be attached to the stamper mount 3 with a high accuracy in connection with centering between the information recorded portion of the stamper 1 and the center shaft 26 by which the center hole of the disk is defined. Furthermore, since the upper surface of the stamper-fixing shaft 55 is flush with the upper surface of the fixing ring 54 having no gap therebetween, there is no possibility that the liquid molding resin 12 penetrates the space or gap therebetween. Accordingly, there is no problem due to the presence of the gap G inherent to the conventional attaching method of FIG. 23. The new structure of the stamper assembly 1 may be applied to any of the previous embodiments.

After the liquid molding resin 12 has been hardened by applying an ultraviolet ray thereto through the backing plate 2, the produced disk is to be detached from the stamper 1 as described in the above. When detaching or removing the disk fixedly adhered to the backing plate 2 from the stamper 1, the stamper 1 receives an upward force which tends to pull up the stamper 1. As a result, the stamper 1 is apt to be partially raised from the stamper mount 3 or to be deformed. To prevent such undesirable phenomena, it is necessary to securely attach the stamper 1 to the upper surface of the mount 3 not only at the center and the periphery of the stamper 1. The present inventors devised a method of securely fixing the stamper onto the stamper mount 3 by means of a magnetic force as will be described hereinafter.

Figure 27:
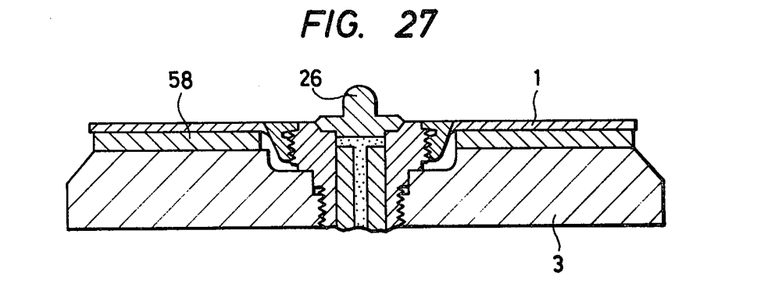
FIGS. 27 to 29 are schematic diagrams showing the way of attracting the stamper to a stamper mount by means of magnetic forces.

FIG. 27 illustrates an embodiment of the present invention, in which the stamper 1 is attracted by a flexible magnetic sheet 58 interposed between the stamper 1 and the stamper mount 3. The stamper 1 is made of a magnetic material, such as nickel, and the stamper mount 3 is also made of a magnetic material such as iron or nickel. The magnetic sheet 58 may be adhered to the stamper mount 3 by means of an adhesive. In this case the stamper mount 3 may be made of a nonmagnetic material.

Figure 28:
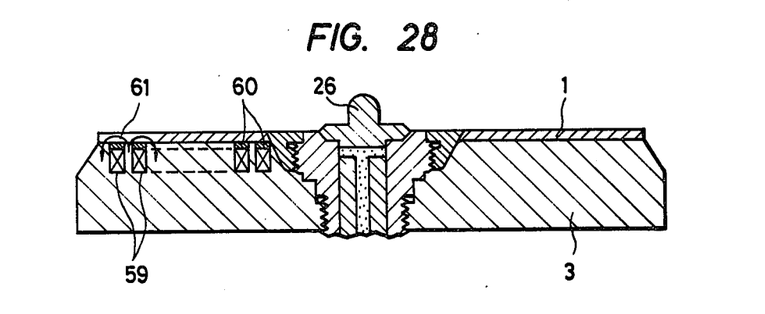

FIG. 28 illustrates another embodiment in which the stamper 1 is attracted by magnetic forces induced by a plurality of electromagnets. Namely, a plurality of coils 59 are embedded in holes made on the surface of the stamper mount 3. In order to make the upper surface of the stamper mount 3 flat, a nonmagnetic material 60, such as brass, aluminum or the like, is filled in the space above respective coils 59. The lines of magnetic force are indicated at 61, passing through the stamper 1. Thus, the stamper 1 is attracted toward the stamper mount 3. The coils are arranged to be supplied with an electrical current from a power source (not shown) via a switch (not shown). The coils 59 may be energized only when the produced disk is detached from the stamper 1 by turning on the switch.

Figure 29:
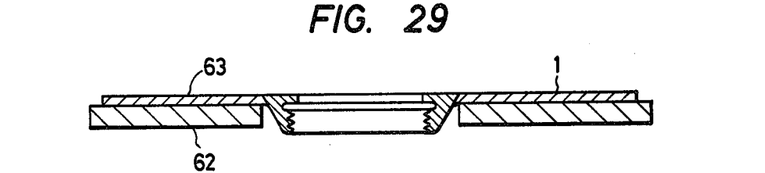

Since the stamper 1 per se is thin (0.1 to 0.5 millimeters thick), magnetic saturation is apt to occur. In this case, an adequate attracting force cannot be obtained. This problem may be resolved by the following embodiment of FIG. 29. The stamper 1 of FIG. 29 is reinforced by a sheet of a magnetic material, such as iron, nickel or the like, whose thickness is much greater than that of the stamper 1. The sheet 62 is attached to the lower surface of the stamper 1 by means of a suitable adhesive 63. The thickness of the sheet 60 may be 1 to 5 millimeters to provide an adequate attracting force. With this arrangement, the produced disk may be smoothly detached from the stamper 1 without causing the deformation or displacement of the stamper 1.

From the foregoing description, it will be understood that high quality information recording disks can be manufactured since air bubbles are effectively prevented from being taken in the liquid molding resin, while the eccentricity of the disk is satisfactorily suppressed. Especially, when copying video disks, high productivity, which could not be obtained up to this time, can be achieved.

The above-described embodiments are just examples of the present invention, and therefore, it will be apparent for those skilled in the art that many modifications and variations may be made without departing from the spirit of the present invention.

What is claimed is:

1. A device for producing information recording disks by pressing a synthetic resin by a disk stamper, comprising:
    (a) first means for placing a disk stamper thereon;
    (b) second means for fixing said disk stamper to said first means;
    (c) third means for supporting a backing plate which will be a part of an information recording disk to be produced so that one side of said backing plate faces an upper surface of said disk stamper placed on said first means;
    (d) fourth means for moving said third means toward said first means so as to define a space between said backing plate and said disk stamper;
    (e) injecting means for injecting a liquid molding resin into said space between said backing plate and said disk stamper having a center hole, said injecting means being located at the center of said first means so that said resin is injected through said center hole of said disk stamper into said space and said injected resin will be stretched outwardly radially as said backing plate is moved toward said disk stamper;

(f) means for irradiating the stretched resin layer by an ultraviolet ray through said backing plate for hardening said resin; and (g) preventing means for preventing said ultraviolet ray from irradiating the liquid molding resin within said injecting means during irradiation and hardening of said stretched resin layer.

2. A device as claimed in claim 1 wherein said preventing means comprises closing means for said injecting means.

3. A device as claimed in claim 1 wherein said preventing means comprises movable means within said injecting means.

4. A device as claimed in claim 3 wherein said preventing means further comprises flange means formed on said second means cooperating with said movable means.

5. A device as claimed in claim 1 wherein said injecting means comprises said second means as an integral part thereof.

6. A device as claimed in claim 1 wherein said injecting means further comprises means for accurately positioning said backing plate.

7. A device for producing information recording disks by pressing a synthetic resin onto a disk stamper, comprising:

(a) a stamper mount for placing said disk stamper thereon, said stamper mount having a center bore, said disk stamper having a center hole;

(b) means for causing a backing plate, which will be a part of an information recording disk to be produced, to move toward said stamper mount;

(c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudial axis of said pin at right angles thereby supporting said backing plate on said flat portion to define said annular space between said backing plate and said disk stamper such that one side of said backing plate faces the upper surface of said disk stamper placed on said stamper mount; and (d) means for irradiating the stretched resin layer by an ultraviolet ray through said backing plate for hardening said resin, said injection valve assembly comprising a plurality of passages made around a center bore of said stamper-fixing shaft, said passages having outlets, said pin arranged to move in said center bore so as to open and close the outlets of said passages communicating with said center bore at said outlets.

8. A device for producing information recording disks by pressing a synthetic resin onto a disk stamper, comprising:

(a) a stamper mount for placing said disk stamper thereon, said stamper mount having a center bore, said disk stamper having a center hole;

(b) means for causing a backing plate, which will be a part of an information recording disk to be produced, to move toward said stamper mount;

(c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudial axis of said pin at right angles thereby supporting said backing plate on said flat portion to define said annular space between said backing plate and said disk stamper such that one side of said backing plate faces the upper surface of said disk stamper placed on said stamper mount; and (d) means for irradiating the stretched resin layer by an ultraviolet ray through said backing plate for hardening said resin, said means for causing said backing plate to move comprising a recess at the center of a lower surface thereof for partially receiving said center projection at the top end of said tapered flange portion of said pin.

9. A device for producing information recording disks by pressing a synthetic resin onto a disk stamper, comprising:
   (a) a stamper mount for placing said disk stamper thereon, said stamper mount having a center bore, said disk stamper having a center hole;
   (b) means for causing a backing plate, which will be a part of an information recording disk to be produced, to move toward said stamper mount;
   (c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudinal axis of said pin at right angles thereby supporting said backing plate on said flat portion to define said annular space between said backing plate and said disk stamper such that one side of said backing plate faces the upper surface of said disk stamper placed on said stamper mount; and
   (d) means for irradiating the stretched resin layer by an ultraviolet ray through said backing plate for hardening said resin,
   said flange portion of said pin being placed between said backing plate and the upper surface of said flange portion of said stamper-fixing shaft.

10. A device for producing information recording disks by pressing a synthetic resin onto a disk stamper, comprising:
   (a) a stamper mount for placing a disk stamper thereon, said stamper mount having a center bore, said disk stamper having a center hole;
   (b) means for causing a backing plate, which will be a part of an information recording disk to be produced, to move toward said stamper mount;
   (c) an injection valve assembly for injecting a liquid molding resin into an annular space between said backing plate and said disk stamper, said injection valve assembly having a hollow cylindrical stamper-fixing shaft engageable with said center bore of said stamper mount, and a pin movably received in the hollow cylinder of said stamper-fixing shaft, said pin having a flange portion and a center projection at a top end of said flange portion, said pin having an axial passageway and a plurality of outlets communicating with said axial passageway, said outlets being made at a position close to said flange portion and extending radially outwardly, said pin being movable between first and second positions so that said outlets are closed by a cylindrical wall of said hollow cylinder when in said first position and opened when in said second position so that said liquid molding resin from said axial passageway of said pin is injected into said annular space via said outlets, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudinal axis of said pin at right angles, thereby supporting said backing plate on said flat portion to define said annular space between said backing plate and said disk stamper such that one side of said backing plate faces an upper surface of said disk stamper placed on said stamper mount;
   said flange portion of said pin being above said outlets,
   said outlets being arranged to be closed when said pin is moved so that said flange portion is in contact with an upper portion of said stamper-fixing shaft, and
   (d) means for irradiating the stretched resin layer by an ultraviolet ray through said backing plate for hardening said resin.

11. A device for producing information recording disks by pressing a synthetic resin onto a disk stamper, comprising:
   (a) a stamper mount for placing a disk stamper thereon, said stamper mount having a center bore, said disk stamper having a center hole;
   (b) means for causing a backing plate, which will be a part of an information recording disk to be produced, to move toward said stamper mount;
   (c) an injection valve assembly for injecting a liquid molding resin into an annular space between said backing plate and said disk stamper, said injection valve assembly having a hollow cylindrical stamper-fixing shaft engageable with said center bore of said stamper mount, and a pin movably received in the hollow cylinder of said stamper-fixing shaft, said pin having a flange portion and a center projection at a top end of said flange portion, said pin having an axial passageway and a plurality of outlets communicating with said axial passageway, said outlets being made at a position close to said flange portion and extending radially outwardly, said pin being movable between first and second positions so that said outlets are closed by a cylindrical wall of said hollow cylinder when in said first position and opened when in said second position so that said liquid molding resin from said axial passageway of said pin is injected into said annular space via said outlets, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudinal axis of said pin at right angles, thereby supporting said backing plate on said flat portion to define said annular space between said backing plate and said disk stamper such that one side of said backing plate faces an upper surface of said disk stamper placed on said stamper mount;

said flange portion of said pin having a tapered periphery, and said stamper-fixing shaft having a recess, at its upper surface, for receiving said flange portion of said pin when said pin is moved to said stamper-fixing shaft, said recess having a tapered wall corresponding to the tapered periphery of said flange portion, and (d) means for irradiating the stretched resin layer by an ultraviolet ray through said backing plate for hardening said resin.

12. A device as claimed in claim 11, wherein said flange portion of said pin has a beveled portion along an upper peripheral edge thereof.

13. A device as claimed in claim 11, wherein said flange portion of said stamper-fixing shaft has an annular recess on the upper surface thereof.

14. A device for producing information recording disks by pressing a synthetic resin onto a disk stamper, comprising:

(a) a stamper mount for placing said disk stamper thereon, said stamper mount having a center bore, said disk stamper having a center hole;

(b) means for causing a backing plate, which will be a part of an information recording disk to be produced, to move toward said stamper mount;

(c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudinal axis of said pin at right angles thereby supporting said backing plate on said flat portion to define said annular space between said backing plate and said disk stamper such that one side of said backing plate faces the upper surface of said disk stamper placed on said stamper mount;

(d) means for irradiating the stretched resin layer by an ultraviolet ray through said backing plate for hardening said resin; and (e) a magnetic sheet placed on said first means made of a magnetic material for attracting said disk stamper.

15. A device for producing information recording disks by pressing a synthetic resin onto a disk stamper, comprising:

(a) a stamper mount for placing said disk stamper thereon, said stamper mounting having a center bore, said disk stamper having a center hole;

(b) means for causing a backing plate, which will be a part of an information recording disk to be produced, to move toward said stamper mount;

(c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudinal axis of said pin at right angles thereby supporting said backing plate on said flat portion to define said annular space between said backing plate and said disk stamper such that one side of said backing plate faces the upper surface of said disk stamper placed on said stamper mount;

(d) means for irradiating the stretched resin layer by an ultraviolet ray through said backing plate for hardening said resin; and (e) a magnetic sheet fixedly attached to said first means for attracting said disk stamper.

16. A device for producing information recording disks by pressing a synthetic resin onto a disk stamper, comprising:
- (a) a stamper mount for placing said disk stamper thereon, said stamper mount having a center bore, said disk stamper having a center hole;
- (b) means for causing a backing plate, which will be a part of an information recording disk to be produced, to move toward said stamper mount;
- (c) an injection valve assembly for injecting a liquid molding resin into an annular space between said backing plate and said disk stamper, said injection valve assembly having a stamper-fixing shaft engageable with said center bore of said stamper mount and having an annular axial passageway and a tapered outlet communicating with said passageway, and a pin movably received in the center of said stamper-fixing shaft, said pin having a tapered flange portion and a center projection at a top end of said flange portion, said tapered flange portion of said pin and said tapered outlet of said stamper-fixing shaft constituting an injection valve, said pin being movable between first and second positions so that said tapered outlet is closed by said tapered flange portion when in said first position and opened when in said second position so that said liquid molding resin from said annular passageway of said stamper-fixing shaft is injected into said annular space via a tapered annular opening defined between a tapered surface of said tapered flange portion and another tapered surface of said tapered outlet, said stamper-fixing shaft having a flange portion with which said disk stamper is fixed at said center hole to said stamper mount when said stamper-fixing shaft engages said center bore of said stamper mount, said center projection being arranged to be inserted into a center hole of said backing plate so as to position the same at a predetermined position, said flange portion of said pin having a flat portion whose plane intersects a longitudial axis of said pin at right angles thereby supporting said backing plate on said flat portion to define said annular space between said backing plate and said disk stamper such that one side of said backing plate faces the upper surface of said disk stamper placed on said stamper mount;
- (d) means for irradiating the stretched resin layer by an ultraviolet ray through said backing plate for hardening said resin; and
- (e) a plurality of coils embedded in said first means made of a magnetic material, said coils being arranged to be energized to attract said disk stamper.

* * * * *